United States Patent

Georges

[15] 3,642,553
[45] Feb. 15, 1972

[54] BONDING CORDS WITH BLOCKED ISOCYANATES

[72] Inventor: Louis W. Georges, Akron, Ohio
[73] Assignee: The Firestone Tire & Rubber Company, Akron, Ohio
[22] Filed: Jan. 9, 1970
[21] Appl. No.: 1,896

[52] U.S. Cl..............................156/308, 117/76 T, 152/357, 156/110 A, 156/331, 161/60
[51] Int. Cl. ..............................................C09j 5/02
[58] Field of Search..........................260/29.2 TN; 152/357; 156/110 A, 331; 161/60

[56] References Cited

UNITED STATES PATENTS

| | | |
|---|---|---|
| 3,460,973 | 8/1969 | Hantzer et al................156/110 A X |
| 2,976,202 | 3/1961 | Salem et al........................156/110 A |
| 3,234,067 | 2/1966 | Krysiak..........................156/110 A X |
| 3,503,934 | 3/1970 | Chilvers..........................156/331 X |

Primary Examiner—Leland A. Sebastian
Attorney—S. M. Clark and Gordon B. Seward

[57] ABSTRACT

Adhesion of cord fabric, especially polyester cord fabric, to elastomer compounds is achieved using an adhesive made from blocked isocyanates. The blocked isocyanates are dissolved in an organic solvent, and then dispersed into water to form an aqueous mixture. The cord fabric is dipped into the aqueous mixture and heated to dry the cord and dissociate the blocked isocyanate. Cord fabric thus treated is calendered to coat it with an elastomer compound, and the coated fabric is assembled into composite articles of cord and elastomers (such as tires or belts) which are vulcanized with heat and pressure.

6 Claims, No Drawings

BONDING CORDS WITH BLOCKED ISOCYANATES

BACKGROUND OF THE INVENTION

This invention relates to a process for treatment of cord fabric which produces improved adhesion of the fabric to an elastomeric compound; and to the composite fabric-elastomer produced thereby. More specially, the invention relates to a cord-dipping process which yields an improved adhesive bond between the cord and the rubbery elastomer which surrounds the cord; and to cord-reinforced elastomeric products thus produced, motor vehicle tires, for example.

In the manufacture of motor vehicle tires, a continuing demand for stronger, more heat-resistant carcasses has promoted the adoption of increasingly better performing cord materials. The original cotton cord was completely replaced by rayon; the development of nylon, and more recently, polyester cord fabrics, has promoted their wide use. Additionally, metal and glass cord fabrics have captured a portion of the tire market.

Adhesion to rubber has always been the first technical barrier to the introduction of improved cord materials. The problem of adhering polyester cords to rubber is one which has occupied the attention of tire scientists to a great degree in recent years. The proposed solutions to date have not been altogether successful.

Early work on polyester-rubber adhesion systems produced a number of so-called "two-dip" processes, which required that the cord fabric be passed twice through the treatment ovens. Efforts to avoid this costly system, and to devise a cord treatment which could be performed on existing equipment, have been largely unsuccessful.

The basis of much of the technology of adhesion of dissimilar materials lies with the use of an agent which is, in a sense, difunctional. That is, it possesses a functionally or characteristic which is compatible with each of the dissimilar materials. Early work with cotton cord brought about the use of a rubber cement dip, which gave a strong mechanical bond to the cotton fibers and adequate adhesion to the surrounding rubber. The use of smooth synthetic fibers in cord necessitated development of a chemical bond to the fiber. Resin systems (such as resorcinol-formaldehyde condensates) in combination with new latex materials (such as those polymers containing vinyl-pyridine monomer units) gave an adequate solution to this adhesion problem for rayon and nylon cord.

In polyester cord work, adhesive systems containing isocyanate compounds have produced some evidence of a chemical bond. Most of the isocyanate compounds, however, react quite readily with water, and thus their use in aqueous systems is impossible. The use of isocyanates in organic solvent systems is very effective, however, the resultant difficulties of solvent recovery and the hazard of fires have made solvent-dips unacceptable to most tire producers.

In recent years, so-called "blocked" isocyanate compounds have been developed and marketed which allow the use of the isocyanate-based adhesives in aqueous systems. Isocyanates which contain phenol or caprolactam groups, for example, retard the reaction of the isocyanate radical with water. At elevated temperatures the compound dissociates, leaving the NCO groups free to form a bond with the polyester. Cord-dip adhesive systems using these "blocked" isocyanates have been moderately successful in giving the required adhesion of the polyester cord to rubber.

The study of rubber-to-fabric adhesion deals not only with cord-dipping methods, but also with the rubber compound which is calendered onto the cord fabric. Systems have been developed which incorporate an aldehyde-resorcinol condensate resin in the rubber compound, or include the resin components, for in situ production of the resin. Inclusion of fine particle size silica along with the resin in this type of rubber compound has given very good adhesion results, even with untreated cord fabric. Where polyester cord fabric is concerned, however, some pretreatment of the cord is necessary.

SUMMARY OF THE INVENTION

It is an object of this invention to provide a process for producing composite articles of fabric and elastomers which have improved strength and resistance to heat.

It is another object of this invention to provide a process for producing pneumatic tires having improved adhesion between the cord fabric and the elastomer compound.

It is still another object of this invention to provide a process for treating cord fiber material to coat it with an adhesive compound which provides chemical affinity between the cord fiber and an elastomeric compound applied thereon.

It is a further object of this invention to provide an adhesive process requiring a considerably lower than usual "pickup" of adhesive compound.

It is yet another object of this invention to provide tires, belts, footwear and similar articles of improved strength and durability.

These and other objects are accomplished by the methods shown.

The invention lies in the process of producing better adhesion of fabric to elastomers by the use of "blocked" isocyanate compounds in aqueous emulsion applied to the fabric cords. The "blocked" isocyanate compounds are first dissolved in an organic solvent system. The resulting solution is then emulsified or dispersed in water, using standard techniques to shear the mixture; and the fabric is coated by known dipping methods. Oven drying of the dipped fabric removes all volatile materials, and also dissociates the "blocked" isocyanate compound to leave it in a reactive condition. The fabric is then calendered to coat it with a thin layer of elastomer compound; the coated fabric then being assembled into articles such as tires, belts, etc., and cured to a finished product with heat and pressure.

The cord material used may be any of the standard reinforcing materials used for imparting strength and dimensional stability to composite rubber articles. Cotton, rayon, nylon, glass, and metal cords may be used, however, particular advantage is realized when the process of the invention is used with polyester fibers, which have recently come into wide use in automobile tires. While stranded cord fabric is contemplated as the preferred fiber form, random fibers may also be employed to reinforce rubber, with adhesion being improved by the process of the invention.

The elastomeric materials which may be used to advantage include natural rubber; polybutadiene; polyisoprene; butyl rubber; copolymers of styrene or acrylonitrile with butadiene, styrene or other conjugated diene monomers; ethylene-propylene-diene monomer elastomers (EPDM); and chloroprene polymers. Of these materials, natural rubber, polybutadiene, and a butadiene-styrene copolymers have the widest usage in this type of product. The elastomers are compounded with standard rubber compounds well known in the art, including carbon block and other reinforcing fillers, sulfur, accelerators, zinc oxide, antioxidants, antiozonants, plasticizers, retarders, and tackifiers. In addition, the inclusion in the elastomer compound of a small amount of resorcinol or phenol, together with para-formaldehyde or hexamethylenetetramine is especially recommended. The presence of a reinforcing silica material is also very effective for maximum adhesion.

The isocyanate compounds which are recommended are those "blocked" isocyanates which liberate reactive NCO groups on heating them to elevated temperatures, but which will not react with water at temperatures below about 100° C. the base isocyanates (unblocked) have the general formula

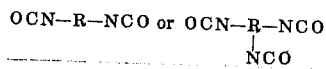

where R is an aliphatic, aromatic or cycloaliphatic hydrocarbon radical of from four to 30 carbon atoms. Typical compounds corresponding to this formula are:

polymethylene polyphenylisocyanate (PAPI)
triphenyl methane-triisocyanate (TMTI)
2,4-tolylene-diisocyanate(2,4 TDI)
2,6-tolylene-diisocyanate(2,6 TDI)
bitolylene diisocyanate (TODI)
dianisidine diisocyanate (DADI)
hexamethylene diisocyanate (HDI)
m-phenylene diisocyanate (PDI)
1-alkyl-benzene-2,4-diisocyanate (AB-2,4-DI)
1-alkyl-benzene-2,5-diisocyanate (AB-2,5-DI)
2,6-dialkyl-benzene-1,4-diisocyanate (DBDI)
1-chlorobenzene- 2,4-diisocyanate (CDI)
dicyclohexylmethane-diisocyanate (CXDI)
3,3-dimethoxy diphenyl methane-4,4'-diisocyanate (DDM-DI)
1-nitrobenzene-2,4-diisocyanate (NDI)
1-alkoxy-benzene-2,4-diisocyanate (ABDI)
1-alkylbenzene-2,6-diisocyanate (ADI)
m-xylylene-diisocyanate
1,3-dimethyl-4,6-bis (-isocyanateethyl)-benzene-diisocyanate
hexahydrobenzidine-4,4'-diisocyanate
ethylene-diisocyanate
propylene-1,2-diisocyanate
cyclohexylene-1,2-diisocyanate
3,3'-dichloro-4,4'-biphenylene diisocyanate
2,3-dimethyl-tetramethylene diisocyanate
p,p'-diphenylene diisocyanate
2-chlorotrimethylene diisocyanate
butane--triisocyanate
trimethylene diisocyanate
tetramethylene diisocyanate
propylene-1,2-diisocyanate
butylene-1,2-diisocyanate
ethylidene diisocyanate These isocyanates are "blocked" or "capped" by reacting them with phenol, caprolactam, or other known blocking agents to produce a compound which will not exhibit the normal reactivity of isocyanates to active hydrogen-containing compounds at relatively low temperatures, but which will dissociate on heating to temperatures substantially above those at which the dipping compound is maintained, up to about 250° C.

Since the process of dipping cord fabric to apply an adhesive is preferably done with water-based adhesives the isocyanate based compounds of the invention (suitably "blocked") must be incorporated into an aqueous system. It is recommended that this procedure be done by dissolving the "blocked" isocyanate in appropriate organic solvents, and then emulsifying the solution in water. Suitable solvents are those which will completely dissolve the isocyanate, or, in partially dissolving it, leave a residue which may be separated by filtration or decantation. The choice of the appropriate solvent is dictated largely by the characteristics of the particular isocyanate compound and any convenient solvent which will dissolve the "blocked" isocyanate compound may be used. For example, chlorinated aliphatic or aromatic compounds, such as trichloroethylene or chlorobenzene are effective. Dimethyl sulfoxide is also a good solvent for the "blocked" isocyanates, and works well in the process of the invention.

The solvents may be used alone, or in combinations of two or more, to give the proper characteristics of solubility and boiling point. Solvents which are somewhat water soluble, such as the oxygenated solvents mentioned, are especially preferred, since they themselves will not have to be emulsified. Thus a multiphase system is avoided by choosing solvents which have at least a limited solubility in water. Since the solvents are volatilized in the drying treatment, consideration should be given to possible hazards of handling vapors thus produced. Particular solvents which perform well when used with the recommended isocyanates are dioxane, tetrahydrofuran, methylcellosolve, and furfural. Known emulsifying techniques are employed in producing the emulsions, using high-shear agitation. Although an emulsifying agent is not essential, the use of certain cationic or amphoteric emulsifying agents has been shown to be beneficial. Such materials are:

Hyamine 2389 (methyl dodecylbenzyl trimethyl ammonium chloride)
Ethomeen C15 ethylene oxide condensation production or primary fatty amines)
Triton QS15 (oxyethylated sodium salt of amphoteric surfactant)
Antaron FC34 (amphoteric fatty amino amide)
Lauryl pyridinium chloride Anionic and nonionic emulsifiers, while they are effective in producing a good emulsion, give cord adhesion test results which are not as good as those obtained with the cationic or amphoteric agents listed. Preferred amounts of emulsifier are from 0.07 to 1.50 percent by weight, based on the total emulsion.

Aqueous dip formulations may be effectively used containing from about 0.1 to about 20 percent of the isocyanate compound, by weight. The concentration used is important in determining the final pickup of adhesive on the cord fabric after drying. The pickup can be relatively low as compared with conventional latex-resin dips used with rayon and nylon cord treatments, and from about 0.1 percent up to about 10 percent, preferably from about 0.5 to 3 percent provides good cord adhesion.

The dipping operation is carried out in conventional continuous-drying ovens designed for cord fabric dipping. These ovens generally employ several heating zones, and are equipped to apply varying tensions to the cord fabric during its travel through the successive zones. Conventional drying temperatures from about 150° to about 250° C. are used, with cord fabric tensions adjusted to first stretch, then relax tension on the cord fabric. Total time required for drying can be varied over a wide range without seriously affecting adhesive properties. Best results are found with a three-zone oven having a temperature of from 150° to 200° C. in the first zone, and from 200° to 250° C. in the second and third zone. A stretch of from about 2 to 8 percent in the first zone, followed by a relaxation of from 1 to 3 percent in each of the remaining zones gives optimum results. Dwell times of from 100 to 250 seconds, 30 to 55 seconds, and 20 to 45 seconds in the respective zones produce adequate drying of the fabric.

Calendering of the elastomer compound "skim stock" onto the cord fabric is done in conventional equipment, using standard methods. As previously indicated, the preferred elastomer compound is based on natural or styrene-butadiene copolymer rubber, and is compounded with a resin system along with the conventional compounding ingredients. Fine particle-size silica may also be included.

Tires or other composite articles are assembled or built in conventional ways, and the articles are vulcanized in standard molds with normal temperatures and pressures.

A more complete understanding of the invention can be obtained by reference to the following examples of specific embodiments, in which all percentages are by weight, unless otherwise specified.

SPECIFIC EMBODIMENTS OF THE INVENTION

EXAMPLE I

A "blocked" polyisocyanate compound was examined for solubility in various solvents and combinations of solvents. The compound was a caprolactam-blocked polymethylene polyphenylisacyanate sold under the trade name of Isonateb 123P. In each trial, 8 grams of the Isonate 123P was dissolved by stirring into 40 to 50 grams of solvent. Solution was speeded by heating to 45°–50° Proportions and observations are summarized in the following Table I.

TABLE I

| Trial | 1 | 2 | 3 | 4 |
| --- | --- | --- | --- | --- |

| | | | | |
|---|---|---|---|---|
| Methylcellosolve, gm. | 40 | 35 | 35 | – |
| Furfural, gm. | – | – | 15 | – |
| Dimethyl sulfoxide, gm. | – | – | – | 40 |
| Solution description | Good | Excellent | Excellent | Excellent |

Trials 2 and 3 were repeated, substituting tetrahydrofuran, and then dioxane for the furfural. Excellent solution was obtained in each case. (Solutions described as "excellent" contained no undissolved isocyanate; those described as "good" contained a small amount of undissolved solids.)

EXAMPLE II

Using the solutions of Example I, dispersions of the isocyanate solutions in water were prepared. The solution from trial 2 (48gm.) was added slowly in a fine stream with vigorous agitation to 352 gm. of water. A milky dispersion resulted, with the fine particles of the isocyanate compound tending to remain in suspension. The procedure was repeated, using the solutions from the other trails, and incorporating from 0.3 g. to 1.8 g. of various nonionic, cationic, anionic and amphoteric surfactants. The emulsions obtained were all satisfactory, and appeared slightly more stable than the emulsion with no surfactant.

Using solutions of the isocyanate in dioxane, tetrahydrofuran, and furfural alone, the emulsification procedure was repeated. However, these solutions yielded dispersions which contained some agglomerates, showing the advantage of the presence of some methylcellosolve in the solvent system.

EXAMPLE III

In order to evaluate the effect of varying the solvent, the emulsifier and the drying treatment on the adhesion of polyester cord to rubber, a number of trials were performed. In each case, polyester fibers were dip coated and ovendried; then the coated cord was calendered to apply a coating of elastomer compound to it; the coated fabric was vulcanized into a test pad of elastomer, and adhesion valued were measured.

One of the first standard adhesion tests for tire cord was the "H" test, described in India Rubber World, Vol. 114 pp. 213–217 (1946). Variations of this test, such as the "U" adhesion test and the "T" adhesion test have been developed to meet the needs of the industry. All these tests measure the force required to pull a single cord out from the surrounding rubber; some of the tests being run at elevated temperatures to simulate extreme conditions of speed and loading in a tire. In the following trials, T-pullout adhesion was measured at 110° C., and values are given as pounds per inch.

To evaluate the effect of the emulsifier, a series of trials was run using first no emulsifier, then anionic, nonionic, cationic and amphoteric emulsifiers. Cords dipped with the adhesive compounds thus produced were dried, calendered and tested for adhesion, with the following results as shown in Table II.

TABLE II

| Emulsifier | Type | Adhesion, lb./in. |
|---|---|---|
| None | – | 40 |
| Fatty alcohol sodium sulfate | Anionic | 36 |
| Polyoxyethylated fatty alcohol | Nonionic | 42 |
| Lauryl Pyridinium Chloride | Cationic | 66 |
| Fatty amino amide | Amphoteric | 50 |

The foregoing results demonstrate that adhesion is markedly improved by using either a cationic or an amphoteric emulsifier, and that no improvement is realized with the use of anionic or nonionic emulsifiers.

EXAMPLE IV

To evaluate the effect of emulsifier level, using the material found most effective in Example III, a series of trials was run in which the content of lauryl pyridinium chloride was varied from 0 to 1.5 percent by weight based on total emulsion weight. The following adhesion results were obtained, as summarized in Table III below. The solvent used for dissolving the blocked isocyanate (a caprolactam-blocked (PAPI) was a 7 to 1 mixture of methyl cellosolve and tetrahydrofuran.

TABLE III

| Percent Lauryl Pyridinium Chloride | Adhesion, lb./in. |
|---|---|
| 0.00 | 49 |
| 0.25 | 55 |
| 0.50 | 55 |
| 1.0 | 60 |
| 1.5 | 59 |

The foregoing results indicate that adhesion improves with increasing amounts of emulsifier up to about 1.0 percent by weight of the total emulsion.

EXAMPLE V

Tires are built from polyester cord fabric which is treated with adhesive compositions corresponding to those which produced high adhesion values in the preceding examples. Tests of these tires under extreme service conditions show a resistance to ply separations and other failures attributable to substandard adhesion of cord to rubber. What I claim:

1. In the process of producing a composite article of fabric and elastomers by the steps of coating cord fabric with an isocyanate-based adhesive, calendering a coating of compounded elastomer onto the cord fabric, assembling the cord fabric thus treated into a composite structure together with other elastomeric and metallic elements and vulcanizing the whole with heat and pressure to produce the finished article, the improved process of coating the cord fabric, comprising the steps of dissolving a blocked isocyanate compound which is a reaction product of phenol or caprolactam with an isocyanate compound having the fromula

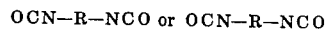

$$OCN-R-NCO \text{ or } OCN-R-NCO$$
$$\hspace{4.5cm} | $$
$$\hspace{4.5cm} NCO$$

where R is an aliphatic, aromatic or cycloaliphatic hydrocarbon radical of from 4 to 30 carbon atoms in a solvent for said blocked isocyanate compound which is dioxane, tetrahydrofuran, methylcellosolve, furfural, or dimethyl sulfoxide, dispersing the solution thus produced in water to form an aqueous mixture, dipping the cord fabric into the aqueous mixture, and heating the dipped cord fabric, whereby the water is driven off and the blocked isocyanate compound dissociates.

2. The process of claim 1, wherein the solution is emulsified in water using an emulsifier.

3. The process of claim 2, wherein the emulsifier is cationic or amphoteric.

4. The process of claim 3, wherein the emulsifier is lauryl pyridinium chloride.

5. The process of claim 1, wherein the cord fabric is a polyester cord fabric.

6. The process of claim 1, wherein the compounded elastomer calendered onto the cord fabric comprises a mixture of a natural or synthetic rubbery elastomer, a sulfur curing system, finely divided silica, resorcinol, and a formaldehyde donor.

* * * * *